(12) United States Patent
Monden

(10) Patent No.: US 8,861,807 B2
(45) Date of Patent: Oct. 14, 2014

(54) FAKE FINGER DETERMINATION DEVICE

(75) Inventor: Akira Monden, Tokyo (JP)

(73) Assignee: NEC Corporation, Tokyo (JP)

( * ) Notice: Subject to any disclaimer, the term of this patent is extended or adjusted under 35 U.S.C. 154(b) by 307 days.

(21) Appl. No.: 13/518,302

(22) PCT Filed: Nov. 22, 2010

(86) PCT No.: PCT/JP2010/070781
§ 371 (c)(1),
(2), (4) Date: Jun. 21, 2012

(87) PCT Pub. No.: WO2011/077879
PCT Pub. Date: Jun. 30, 2011

(65) Prior Publication Data
US 2012/0263355 A1   Oct. 18, 2012

(30) Foreign Application Priority Data
Dec. 22, 2009   (JP) .................................. 2009-290187

(51) Int. Cl.
*G06K 9/00*   (2006.01)
(52) U.S. Cl.
CPC .................................. *G06K 9/00114* (2013.01)
USPC .......................................................... 382/124
(58) Field of Classification Search
None
See application file for complete search history.

(56) References Cited

U.S. PATENT DOCUMENTS

| | | | |
|---|---|---|---|
| 6,011,860 A * | 1/2000 | Fujieda et al. | 382/126 |
| 8,090,657 B2 * | 1/2012 | Mitchell et al. | 705/44 |
| 2004/0012682 A1 * | 1/2004 | Kosaka et al. | 348/207.99 |
| 2006/0104484 A1 * | 5/2006 | Bolle et al. | 382/115 |
| 2008/0247615 A1 * | 10/2008 | Mainguet | 382/125 |

FOREIGN PATENT DOCUMENTS

| | | |
|---|---|---|
| CN | 101114335 A | 1/2008 |
| CN | 101276411 A | 10/2008 |
| JP | 04-078967 A | 3/1992 |
| JP | 2001-243467 A | 9/2001 |
| JP | 2007-511845 A | 5/2007 |
| JP | 2008-217212 A | 9/2008 |
| WO | 2005/050540 A1 | 6/2005 |

OTHER PUBLICATIONS

International Search Report, PCT/JP2010/070781, Dec. 28, 2010.

* cited by examiner

*Primary Examiner* — Vikkram Bali
(74) *Attorney, Agent, or Firm* — Sughrue Mion, PLLC

(57) ABSTRACT

Provided is fake finger determination technology capable of improving the determination accuracy of a fake finger. A fake finger determination device comprises acquisition means for acquiring line width information related to a line width of a ridge or a line width of a valley line of a finger as a determination object, and determination means for determining whether or not the finger as the determination object is a real finger or a fake finger based on the line width information.

12 Claims, 12 Drawing Sheets

FAKE FINGER DETERMINATION DEVICE

CROSS REFERENCE TO RELATED APPLICATIONS

This application is a National Stage of International Application No. PCT/JP2010/070781 filed Nov. 22, 2010, claiming priority based on Japan Patent Application No. 2009-290187 filed Dec. 22, 2009, the contents of all of which are incorporated herein by reference in their entirety.

The present invention relates to a fake finger determination device suitable for recognizing a fake finger.

BACKGROUND

Fingerprint authentication is attracting attention as one type of authentication system for identifying individuals. A fingerprint is unique in that it is different for every person, and that it does not change even with the lapse of time. Accordingly, it is said that fingerprint authentication is more reliable than the currently prevalent password authentication or the like. However, in recent years, damage resulting from forging a person's fingerprint and using such forged fingerprint (hereinafter referred to as the "forged fingerprint") to pass the authentication and thereby conduct fraudulent acts is becoming a problem (for example, Patent Document 1).
[Patent Document 1] Japanese Translation of PCT Application No. 2007-511845

As a method of creating a forged fingerprint, known is a method of pressing a thin film of polyethylene resin or polyvinyl acetate resin on the surface of a person's finger so as to create a forged fingerprint. Upon fingerprint authentication, the surface that was pressed against the finger (that is, the surface on which the forged fingerprint was formed) is used as the front side, and this is attached to the surface of the finger of the person to be authenticated. With a finger to which such forged fingerprint is attached to the surface (that is, a fake finger), there is a problem in that, even if the spectral characteristics are measured upon fingerprint authentication, it is difficult to determine whether or not that finger is a fake finger since the spectral characteristics of the fake finger surface and the spectral characteristics of the finger surface of that person will basically be the same.

SUMMARY

The present invention was devised in view of the foregoing circumstances, and an object of this invention is to provide fake finger determination technology capable of improving the determination accuracy of a fake finger.

The fake finger determination device according to the present invention is characterized in comprising acquisition means for acquiring line width information related to a line width of a ridge or a line width of a valley line of a finger as a determination object, and determination means for determining whether or not the finger as the determination object is a real finger or a fake finger based on the line width information.

Moreover, the fake finger determination device according to the present invention is characterized in comprising determination means for determining whether a line width of a ridge of a finger as a determination object and a line width of a valley line thereof satisfies a predetermined relation, and determination means for determining whether or not the finger as the determination object is a real finger or a fake finger based on a result of the determination.

According to the present invention, it is possible to improve the determination accuracy of a fake finger.

DETAILED DESCRIPTION

The preferred embodiments of the fake finger determination device according to the present invention are now explained with reference to the appended drawings.

A. Assumed Technical Concept

Figure 11:
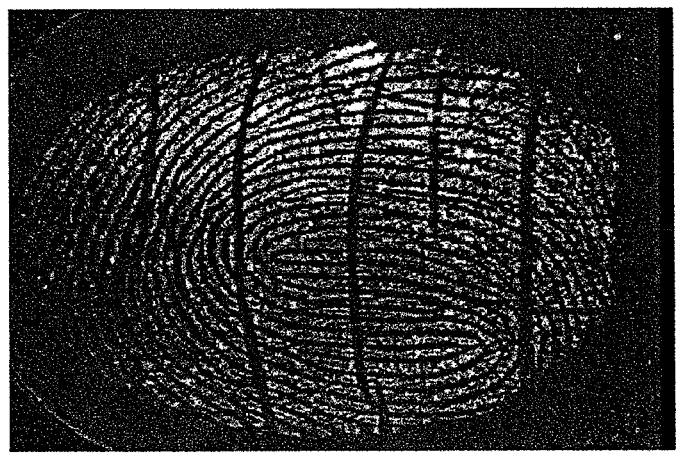
FIG. 11 is a diagram illustrating an authentic fingerprint image.
Figure 12:
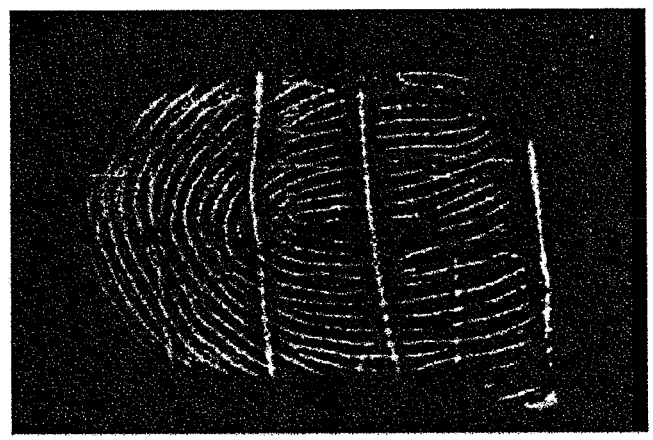
FIG. 12 is a diagram illustrating a forged fingerprint image.

Upon fingerprint authentication, a forged fingerprint that was created by pressing a thin film of polyethylene resin or the like on the surface of a finger is used by being attached to the surface of the finger of the person to be authenticated in a manner where the thin film is reversed. Accordingly, with a fake finger in which a forged fingerprint is attached to its surface, the concavity and convexity of the fake finger and the concavity and convexity of a real finger (that is, a live finger) will be reversed. In other words, since the ridge of the fingerprint of the live finger will be the valley line of the fake finger and the valley line of the live finger will be the ridge of the fake finger, while the fingerprint image of the live finger (hereinafter referred to as the "authentic fingerprint image") will have a thick ridge and a thin valley line (refer to FIG. 11), the fingerprint image of the fake finger (hereinafter referred to as the "forged fingerprint image") will have a thin ridge and a thick valley line (refer to FIG. 12).

The present invention was devised in view of the foregoing characteristics of a fingerprint image. The present invention is advantageous in that this invention can be realized merely by adding the processing of software (that is, without having to newly add or change hardware such as a sensor) to an existing fingerprint authentication system to which a fake finger determination device is already built therein. The forged fingerprint that is reversed as described above is sometimes referred to as a "reverse transfer fingerprint" in the ensuing explanation.

B. First Embodiment

(1) Configuration of this Embodiment

Figure 1:
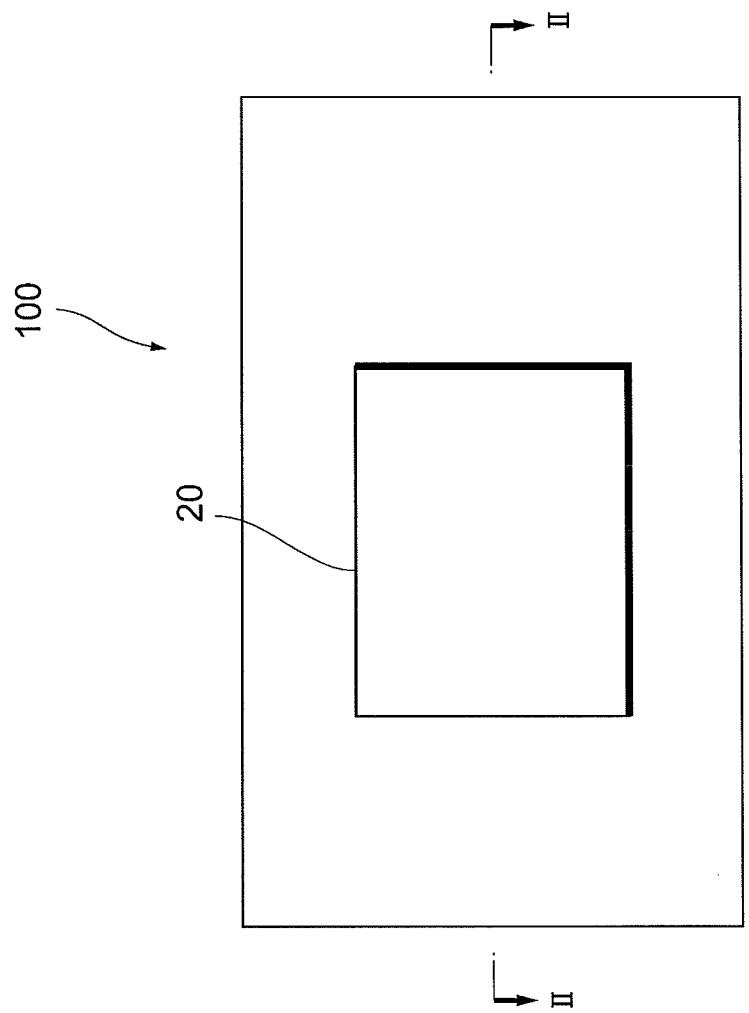
FIG. 1 is a plan view of the fake finger determination device according to the first embodiment.
Figure 2:
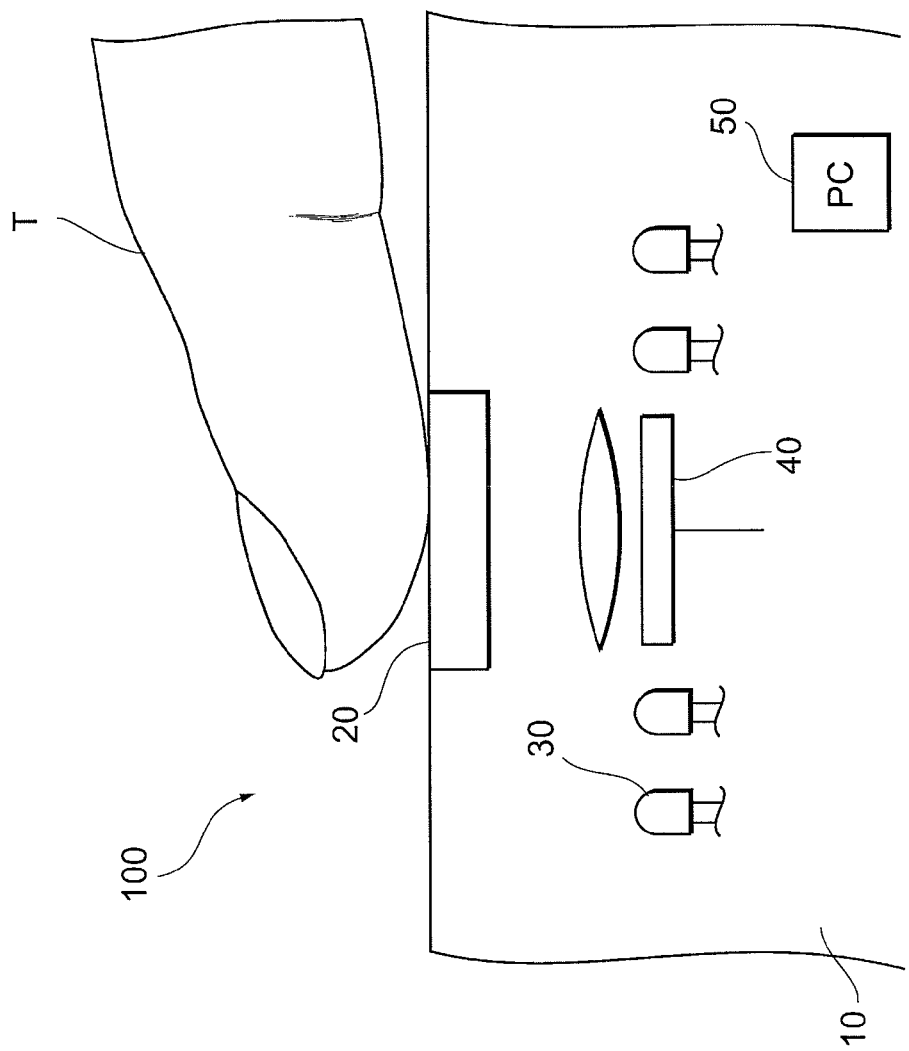
FIG. 2 is a cross section of line II-II of the fake finger determination device illustrated in FIG. 1 according to the foregoing embodiment.

The configuration of a fake finger determination device 100 in the first embodiment is foremost explained with reference to FIG. 1 and FIG. 2. FIG. 1 is a plan view of the fake finger determination device 100 when viewed from directly above, and FIG. 2 is a cross section of line II-II of FIG. 1.

The fake finger determination device 100 is a device for determining whether or not a determination object T to be subject to fingerprint authentication is a fake finger. As shown in FIG. 1 and FIG. 2, the fake finger determination device 100 comprises a housing 10, a sensor surface 20, a light source 30, an imaging device 40, and a computer 50. Note that, in the ensuing explanation, the side to which the sensor surface 20 is provided in the housing 10 is referred to as the upper side.

The sensor surface 20 is a surface where the determination object T (live finger or fake finger in this example) is to be placed, and is configured, for instance, from a fiber optic plate or the like.

The imaging device 40 is a known imaging means and is provided at the lower side of the sensor surface 20. The imaging device 40 performs reflected light sensing by using the light source 30 provided at the lower side of the housing 10, and takes an image of the finger as the determination object T that is placed on the sensor surface 20, and outputs a fingerprint image. Consequently, if the determination object T is a live finger, an authentic fingerprint image with a thick ridge and a thin valley line is obtained (refer to FIG. 11). Meanwhile, if the determination object T is a fake finger, a forged fingerprint image with a thin ridge and a thick valley line is obtained (refer to FIG. 12).

The computer 50 is configured from a CPU (Central Processing Unit), a ROM (Read Only Memory), a RAM (Random Access Memory) and the like, and the CPU centrally controls the respective components of the fake finger determination device 100 by executing the various control programs and the like stored in the ROM and the RAM.

Figure 3:
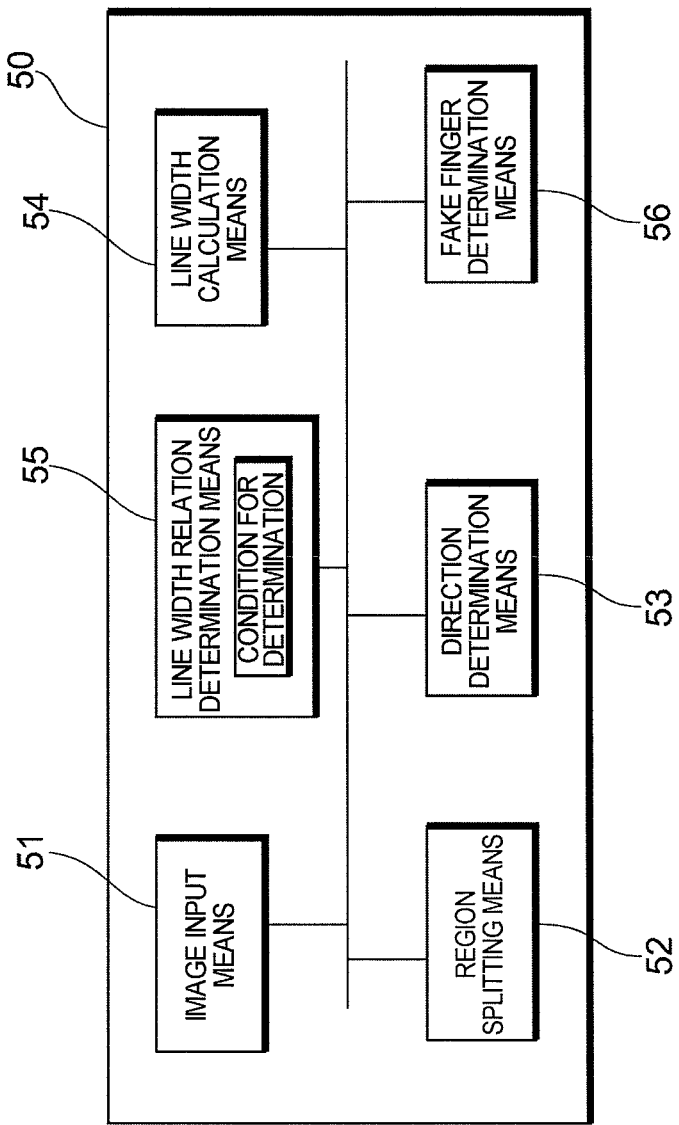
FIG. 3 is a diagram showing the functional block of the computer according to the foregoing embodiment.

FIG. 3 is a functional block diagram of the computer 50. The computer 50 comprises an image input means 51, a region splitting means 52, a direction deciding means 53, a line width calculation means 54, a line width relation determination means 55, and a fake finger determination means 56.

The image input means 51 acquires the fingerprint image that is output from the imaging device 40, and supplies this to the region splitting means 52. Note that the image input means 51 may perform image processing such as histogram equalization or resolution conversion (for example, conversion from 800 dpi to 500 dpi) to the fingerprint image acquired from the imaging device 40 before supplying it to the region splitting means 52.

The region splitting means (splitting means) 52 is a means for splitting the fingerprint image supplied from the image input means 51 into regions. The region splitting means 52 foremost extracts the region containing the characteristic portion of the fingerprint (for example, portion including minutia such as the bifurcation or end point of the ridge) as the processing target region in the fingerprint image, and subsequently splits such processing target region into small regions. The region splitting means 52 desirably splits the processing target region into small regions of a size that will fit two or more and four or less ridges so that the direction and line width of ridges and valley lines can be stably obtained. The reason why a size that will fit two or more ridges is set as the lower limit of the small region is because, if the small region is too small, the direction or line width of the ridges cannot be measured, and it is necessary to secure a size that enables the measurement of the direction and line width of the ridges. The reason why a size that will fit four or less ridges is set as the upper limit of the small region is so that the ridge/valley line in the small region are approximated linearly.

The direction deciding means (deciding means) 53 is a means for deciding the direction of the ridge/valley line in the small region for each small region that was split by the region splitting means 52. As a method of deciding the direction, for example, known methods such as the method using the Fourier transform or the method of using the differential of pixel values may be used.

When using the Fourier transform, the direction deciding means 53 foremost performs Fourier transform to the image that was split into small regions, subsequently obtains the largest frequency component (peak) in a frequency band corresponding to the ridge spacing of the fingerprint, and thereby decides the direction shown with the peak as the ridge/valley line direction of the small region.

When using the differential of pixel values, the direction deciding means 53 decides the direction as follows. Foremost, the direction deciding means 53 uses a differential filter such as a sobel filter for obtaining a direction in which the pixel value increases or decreases, and thereby obtains the edge direction of each pixel in the small region. Subsequently, the average or mode of the edge direction in the small region is used to decide the representative direction in the small region. Finally, a direction that is perpendicular to the representative direction in the small region is decided as the direction of the ridge/valley line in the small region. The direction may also be decided from the differential of pixel values as described above.

The line width calculation means 54 is a means for obtaining the line width of the ridge and valley line by scanning each small region in a direction that is perpendicular to the direction of the ridge/valley line in the small region. As a method of obtaining the line width, known methods such as the method of binarizing an image or the method of checking changes in the pixel value may be used.

When obtaining the line width by binarizing the image, the line width calculation means 54 binarizes the image, and generates a black-and-white image in which the portion with a large pixel value is white and the portion with a small pixel value is black. In addition, the line width calculation means 54 counts the consecutive number of black pixels, and uses that counted number as the ridge width. Meanwhile, the line width calculation means 54 counts the consecutive number of white pixels, and uses that counted number as the valley line width. Note that if there are a plurality of ridges or valley lines in each small region, the average value, maximum value, minimum value or the like of the ridge width or the valley line width is obtained, and the obtained value may be used as the ridge width (representative value) or the valley line width (representative value) in the respective small regions.

Note that, as the binarization method, known statistical methods such as the fixed threshold or Otsu's binarization may be used. Moreover, the binarization threshold may be set individually for each small region, and in this case there is an advantage in that it is possible to flexibly deal with changes in the brightness value of the overall image. Needless to say, one threshold may be set for the overall image rather than for small region. In the foregoing case, if the brightness value of the overall image is flat, the line width can be stably obtained without being affected by noise, and the threshold can be set easily.

When using the method of checking changes in the pixel value, the line width calculation means 54 obtains the line width as follows. Specifically, foremost, changes in the pixel values in the region are checked, and the maximum value and the minimum value of the gradient of changes in the pixel values are obtained. In addition, the point where the gradient of changes in the pixel value takes the maximum value is acknowledged as the start of the ridge (to put it differently, the end of the valley line). Meanwhile, the point where the gradient of changes in the pixel value takes the minimum value is acknowledged as the end of the ridge (to put it differently, the start of the valley line). Finally, the ridge width (or valley line width) is obtained by counting the number of pixels from the start to end of the ridge (or valley line).

The line width calculation means 54 performs the foregoing processing while scanning the split small regions in a direction that is perpendicular to the direction of the ridge/valley line that passes through the center of the split small regions, and uses the results as the line width of the ridge or valley line in the small region. In addition, for example, it is also possible to obtain the respective line widths on a plurality of scanning lines containing one or more ridges and valley lines in the small region, obtain an average thereof, and use the average line width as the line width of the ridge or valley line in the small region.

The line width relation determination means (determination means) 55 is a means which uses the ridge width or valley line width calculated by the line width calculation means 54 and determines whether the relation of the ridge width and the valley line width obtained for each small region satisfies a predetermined relation. As the predetermined relation (hereinafter referred to as the "condition for determination"), a relation such as the value obtained by dividing the ridge width by the valley line width being a predetermined threshold (for example, "1") or more, or the value obtained by subtracting the valley line width from the ridge width being a predetermined threshold (for example, "0") or more may be used. In other words, when the line width relation determination means 55 determines that the relation of the ridge width (line width information) and the valley line width (line width information) obtained for each small region is a predetermined relation (that is, relation where the line width of the ridge is determined to be greater than the line width of the valley line in the fingerprint image), it determines that the finger corresponding to the fingerprint image is a real finger. Note that the condition for determination is not limited to the above, and various conditions that represent a relation showing that the line width of the ridge is greater than the line width of the valley line may be used.

The fake finger determination means (determination means) 56 is a means for determining whether the determination object T is a fake finger (that is, a reverse transfer fingerprint). Foremost, the fake finger determination means 56 foremost comprehends, among all small regions, the small regions (hereinafter referred to as the "target small regions") that were determined by the line width relation determination means 55 as satisfying the condition for determination. In addition, the fake finger determination means 56 determines that the finger is a fake finger when (1) the number of target small regions is less than a predetermined threshold, or (2) when the ratio of the target small regions relative to all small regions is less than a predetermined threshold. Needless to say, the conditions for determining whether or not a finger is a fake finger are not limited to (1) and (2) above, and whether a finger is a fake finger may also be determined, for example, when the relation of the representative value of the ridge width and the representative value of the valley line width in all small regions does not satisfy the condition for determination. Note that, as the representative value of the ridge width or the valley line width, for example, an average value (or mode) of the ridge width or the valley line width in all regions may be set.

(2) Operation of this Embodiment

Figure 4:
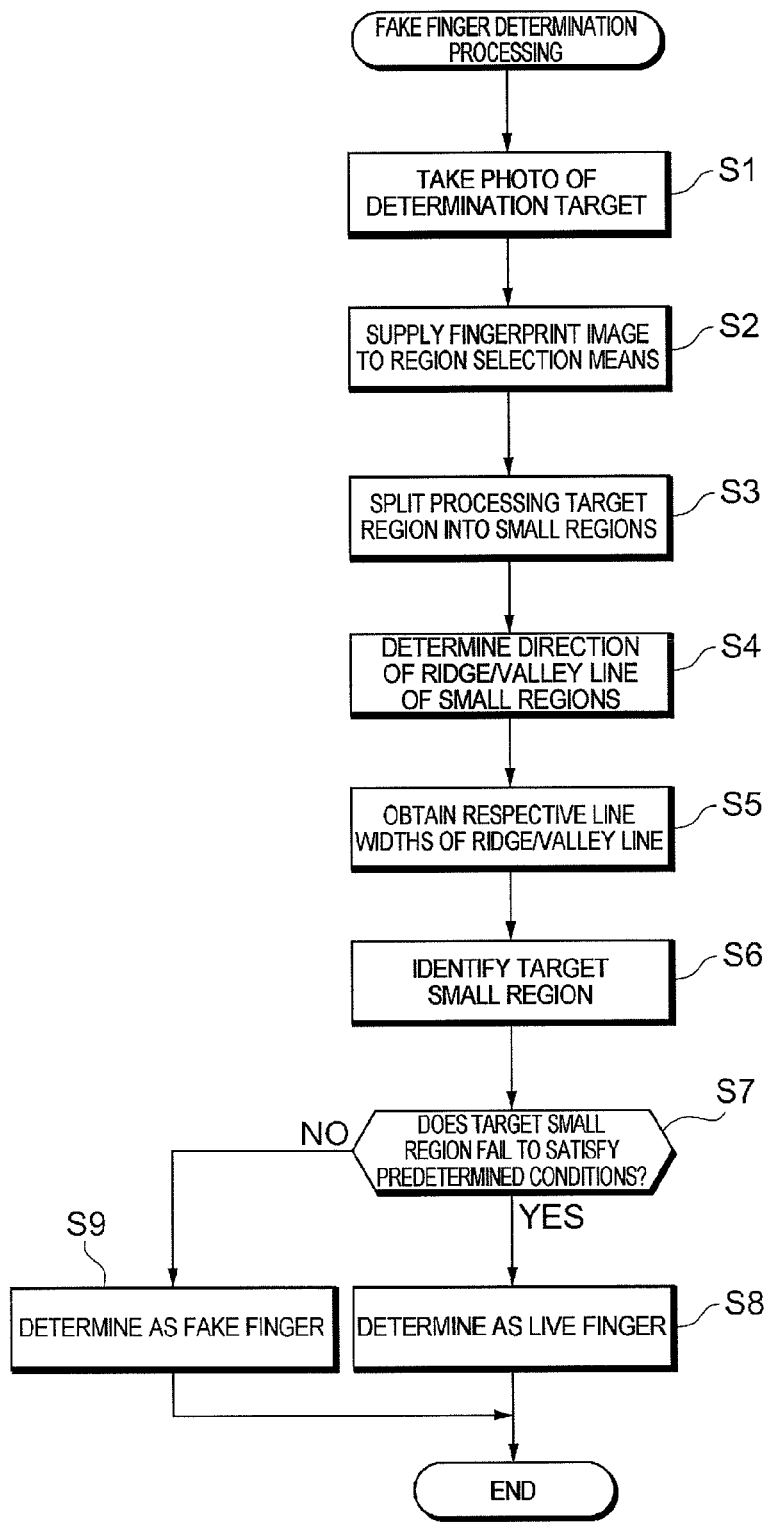
FIG. 4 is a flowchart showing the fake finger determination processing according to the foregoing embodiment.

FIG. 4 is a flowchart showing the operation (fake finger determination processing) of the fake finger determination device 100 in the first embodiment.

When the determination object T is placed on the sensor surface 20, the imaging device 40 uses the light source 30 to perform reflected light sensing, takes a photo of the finger as the determination object T placed on the sensor surface 20 (step S1), and outputs a fingerprint image to the image input means 51.

The image input means 51 acquires the fingerprint image output from the imaging device 40, and supplies this to the region splitting means 52 (step S2). Note that the image input means 51 may perform image processing such as histogram equalization or resolution conversion to the fingerprint image acquired from the imaging device 40 before supplying it to the region splitting means 52.

When the region splitting means 52 receives the fingerprint image from the image input means 51, it foremost extracts the region containing the characteristic portion of the fingerprint (for example, portion including minutia such as the bifurcation or end point of the ridge) as the processing target region in the fingerprint image, and subsequently splits such processing target region into small regions (step S3). When the region splitting means 52 splits the processing target region into small regions (hereinafter referred to as the "small region splitting"), it notifies the direction deciding means 53 to the effect that the small region splitting is complete.

The direction deciding means 53 decides the direction of the ridge/valley line in the small region for each small region that was split by the region splitting means 52 by using the method using the Fourier transform or the method of using the differential of pixel values (step S4), and notifies the decided ridge/valley line direction of the small region to the line width calculation means 54.

When the line width calculation means 54 is notified of the ridge/valley line direction of each small region from the direction deciding means 53, it obtains the line width of the ridge and valley line by scanning the small regions in a direction that is perpendicular to the ridge/valley line direction (step S5), and outputs this to the line width relation determination means 55. Note that, as a method of obtaining the line width, known methods such as the method of binarizing an image or the method of checking changes in the pixel value may be used.

The line width relation determination means 55 uses the ridge width or valley line width calculated by the line width calculation means 54 and determines whether the relation of the ridge width and the valley line width obtained for each small region satisfies a predetermined relation (that is, the "condition for determination"). In addition, the line width relation determination means 55 notifies the fake finger determination means 56 of the determination results on whether the condition for determination is satisfied for each small region.

The fake finger determination means 56 foremost comprehends (identifies), among all small regions, the small regions (hereinafter referred to as the "target small regions") that were determined by the line width relation determination means 55 as satisfying the condition for determination (step S6). In addition, the fake finger determination means 56 determines that the finger is a fake finger when (1) the number of target small regions is less than a predetermined threshold, or (2) when the ratio of the target small regions relative to all small regions is less than a predetermined threshold (that is, "whether or not the target small regions satisfies predetermined conditions") (step S7). The fake finger determination means 56 determines that the finger is a live finger when it determines that the target small regions do not satisfy predetermined conditions (step S8), and then ends the processing. Meanwhile, the fake finger determination means 56 determines that the finger is a fake finger when it determines that the target small regions satisfy the predetermined conditions (step S9), and then end the processing.

As explained above, according to this embodiment, by utilizing the characteristics that are unique to a fingerprint of a live finger (characteristics where the fingerprint of a live finger has thick ridges and thin valley lines), it is possible to accurately and efficiently determine whether or not the determination object is a fake finger.

Moreover, since the foregoing fake finger determination processing can be realized with a known computer, this embodiment can be realized merely by adding the processing of software (that is, without having to newly add or change hardware such as a sensor) to an existing fingerprint authentication system to which a fake finger determination device is already built therein. Note that the foregoing advantage is also yielded in the following embodiments and modified examples.

C. Second Embodiment (1) Configuration of this Embodiment

Figure 5:
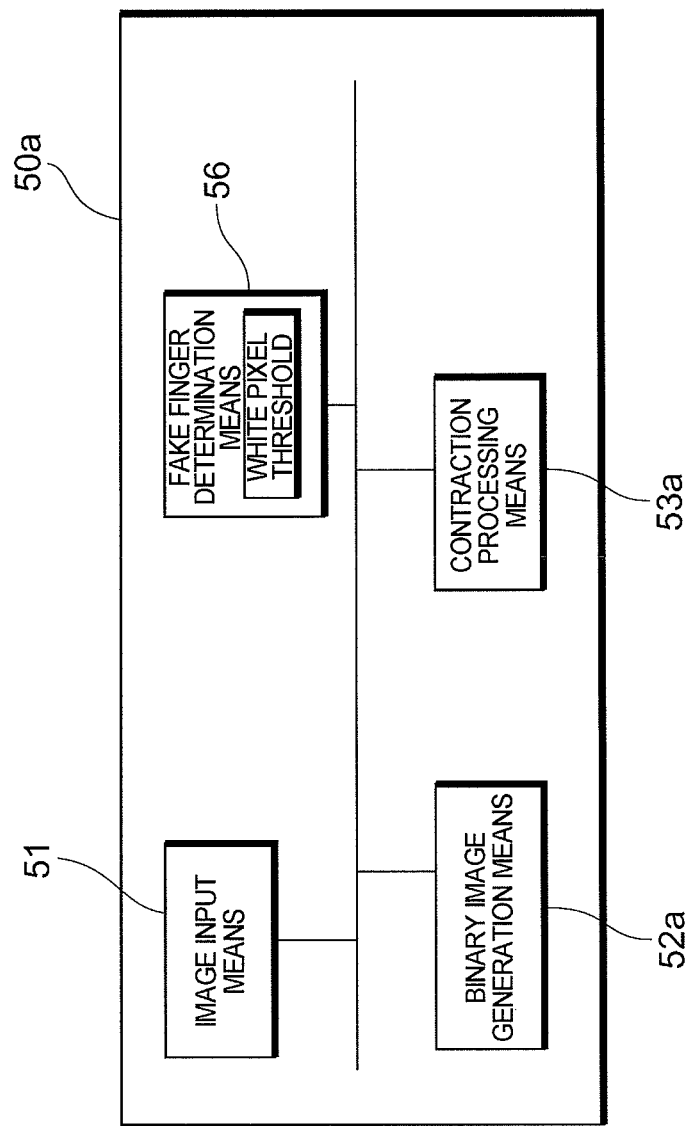
FIG. 5 is a diagram showing the functional block of the computer according to the second embodiment.

FIG. 5 is a functional block diagram of a computer 50a in the second embodiment. Note that the components that correspond to those in FIG. 3 are given the same reference numeral, and the detailed explanation thereof is omitted.

The computer 50a comprises an image input means 51, a binary image generation means 52a, a contraction processing means 53a, and a fake finger determination means 56.

The binary image generation means 52a binarizes the fingerprint image supplied from the image input means 51, and thereby generates a black-and-white binary image. In addition, the binary image generation means 52a outputs the generated binary image to the contraction processing means 53a.

The contraction processing means 53a performs contraction processing on the binary image that was supplied from the binary image generation means 52a. Specifically, the contraction processing means 53a performs the processing (that is, contraction processing) of reducing the region of the white pixels by substituting the white pixels with the black pixels when the number of white pixels in the neighborhood of 4 or neighborhood of 8 (adjacent pixels) is a predetermined number or less. The contraction processing means 53a repeatedly performs this contraction processing a preset number of times (for example, twice). The number of repetitions is set to a number that is required for determining whether or not the finger is a fake finger, and can be obtained in advance via testing or the like.

For example, when an imaging device 40 of 500 dpi is being used, if the determination object T is a live finger, the ridge width of the fingerprint of a live finger is roughly 10 pixels to 16 pixels. Meanwhile, if the determination object T is a fake finger, the ridge width of the fingerprint (reverse transfer fingerprint) of the fake finger will be even thinner than the valley line width of a live finger, and is roughly 1 pixel to 4 pixels. The reason for this is because the thin film used for forming the fingerprint (reverse transfer fingerprint) of the fake finger contracts during the drying of the material, and the ridge width of the fingerprint of the fake finger consequently becomes even thinner.

Each time contraction processing is performed, the line width of the ridge is thinned by 1 pixel at a time from either side; that is, the line width of the ridge is thinned in an amount of a total of 2 pixels. Accordingly, when the contraction processing is performed twice, a ridge with a line width of 4 pixels or less (that is, a ridge of a fingerprint of a fake finger) will disappear, but a ridge with a line width of 10 pixels or more (that is, a ridge of a fingerprint of an authentic finger) will remain. Thus, this embodiment assumes a case where the number of repetitions is set to twice.

When the contraction processing means 53a repeatedly performs the contraction processing a preset number of times (assumed to be twice in this example), it counts the number of white pixels in the binary image after the contraction processing, and notifies the count result (line width information related to the line width of the ridge) to the fake finger determination means 56.

The fake finger determination means (determination means) 56 compares the count result that was notified from the contraction processing means 53a and the white pixel threshold that was set, and determines whether or not the finger is a fake finger based on the comparison results. As described above, if the number of white pixels after the contraction processing is performed twice is large, it is possible to determine that a ridge with a large line width (that is, a ridge of a fingerprint of an authentic finger) existed. Meanwhile, the fake finger determination means 56 can determine that only a ridge with a small line width (that, is a ridge of a fingerprint of a fake finger) existed if the number of white pixels after the contraction processing is performed twice is small. Thus, the fake finger determination means 56 can determine that a ridge with a large line width exists and that the determination object T is a live finger if the count result output from the contraction processing means 53a is the white pixel threshold or more.

Meanwhile, the fake finger determination means 56 can determine that a ridge with a small line width exists and that the determination object T is a fake finger if the count result output from the contraction processing means 53a is less than the white pixel threshold. Note that the white pixel threshold may be suitably set and changed in accordance with the preset number of times that the contraction processing is to be performed. Moreover, in substitute for obtaining the line width information related to the line width of the ridge (count result of the number of white pixels), it is also possible to obtain the line width information related to the line width of the valley line (count result of the number of black pixels). Here, the expansion processing described later may be performed upon obtaining the line width information related to the line width of the valley line (refer to the third embodiment).

(2) Operation of this Embodiment

Figure 6:
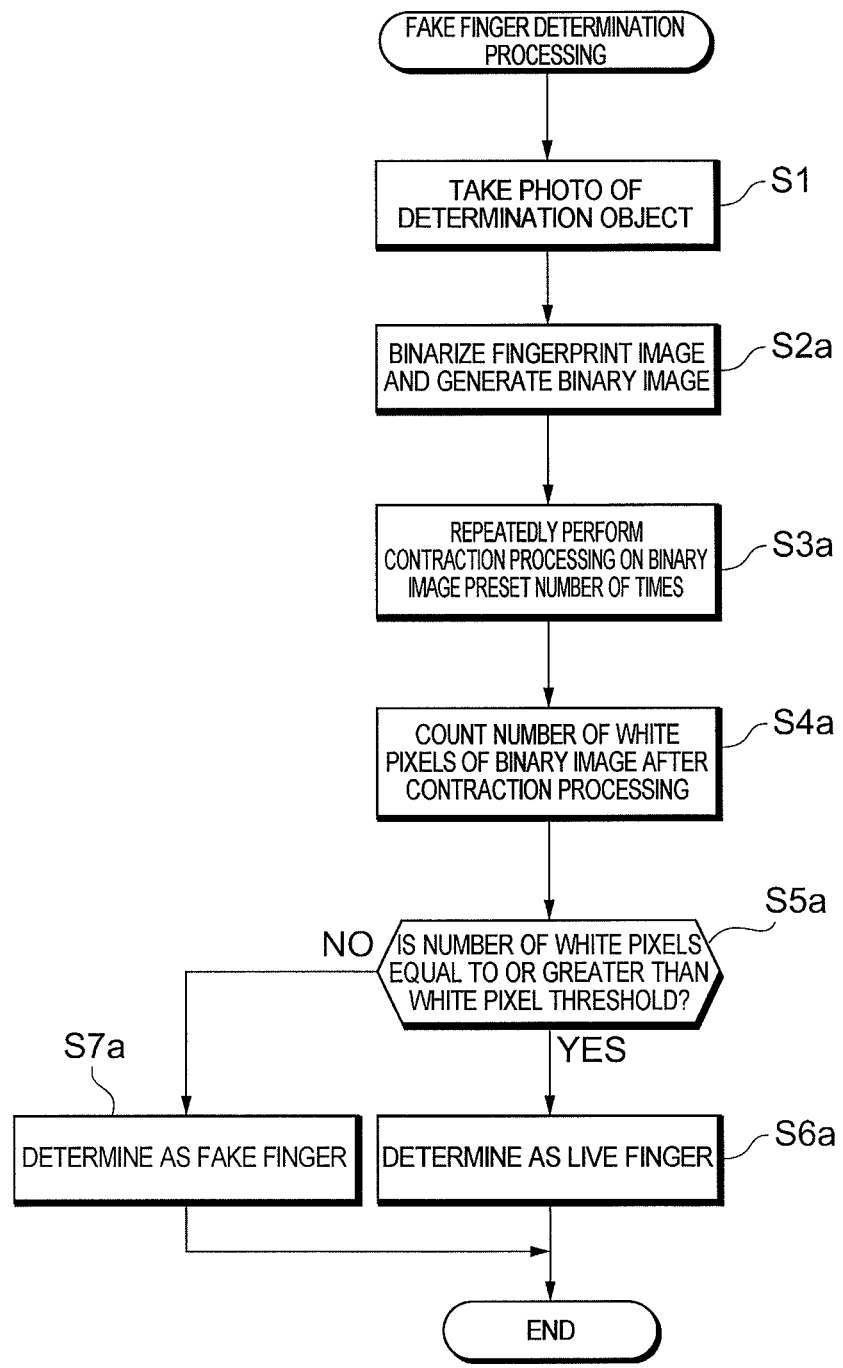
FIG. 6 is a flowchart showing the fake finger determination processing according to the foregoing embodiment.

FIG. 6 is a flowchart showing the operation of the fake finger determination device 100 according to the second embodiment. Note that the steps corresponding to those in FIG. 4 are given the same reference numeral, and the detailed explanation thereof is omitted.

When the binary image generation means 52a receives a fingerprint image from the image input means 51, it binarizes the fingerprint image and thereby generates a black-and-white binary image (step S2a). In addition, the binary image generation means 52a outputs the generated binary image to the contraction processing means 53a.

The contraction processing means 53a repeatedly performs contraction processing on the binary image supplied from the binary image generation means 52a a preset number of times (for example, twice) (step S3a). Details regarding the contraction processing were explained in the section of "Configuration of this embodiment," and the explanation thereof is omitted. When the contraction processing means (counting means) 53a repeatedly performs the contraction processing a preset number of times (assumed to be twice in this example), it counts the number of white pixels in the binary image after the contraction processing, and notifies the count result (line width information related to the line width of the ridge) to the fake finger determination means 56 (step S4a).

The fake finger determination means (determination means) 56 compares the count result that was notified from the contraction processing means 53a and the white pixel threshold that was set, and determines whether or not the finger is a fake finger based on the comparison results (step S5a). As described above, if the number of white pixels after the contraction processing is performed twice is large, it is possible to determine that a ridge with a large line width (that is, a ridge of a fingerprint of an authentic finger) existed. Meanwhile, the fake finger determination means 56 can determine that only a ridge with a small line width (that is, a ridge of a fingerprint of a fake finger) existed if the number of white pixels after the contraction processing is performed twice is small.

Thus, the fake finger determination means 56 determines that a ridge with a large line width exists and that the determination object T is a live finger if the count result output from the contraction processing means 53a is the white pixel threshold or more (step S6a), and then ends the processing. Meanwhile, the fake finger determination means 56 determines that a ridge with a small line width exists and that the determination object T is a fake finger if the count result output from the contraction processing means 53a is less than the white pixel threshold (step S7a), and then ends the processing.

As explained above, according to the second embodiment, unlike the first embodiment, it is possible to determine whether the determination object T is a fake finger without having to obtain the direction of the ridge or the valley line. In particular, when the fingertip is rough, there are cases where the direction of the ridge or the valley line becomes unclear. When the fake finger determination explained in the first embodiment is used in the foregoing case, there is a possibility that the direction of the ridge or the valley line may be erroneously determined. If the direction of the ridge or the valley line is erroneously determined, the determination of the line width will also be erroneous, and there is concern that, ultimately, the determination accuracy regarding whether finger is a fake finger will deteriorate. Meanwhile, according to this embodiment, since there is no need to obtain the direction of the ridge or the valley line, it is possible to accurately determine whether or not the finger is a fake finger even based on a fingerprint in which the direction of the ridge or the valley line is unclear.

(3) Modified Example

In the foregoing second embodiment, a case was explained where a black-and-white binary image is generated from a fingerprint image, without splitting the fingerprint image into small regions, and performing contraction processing on the generated binary image, but it is also possible to split the fingerprint image into small regions, and perform the contraction processing on each small region.

Figure 7:
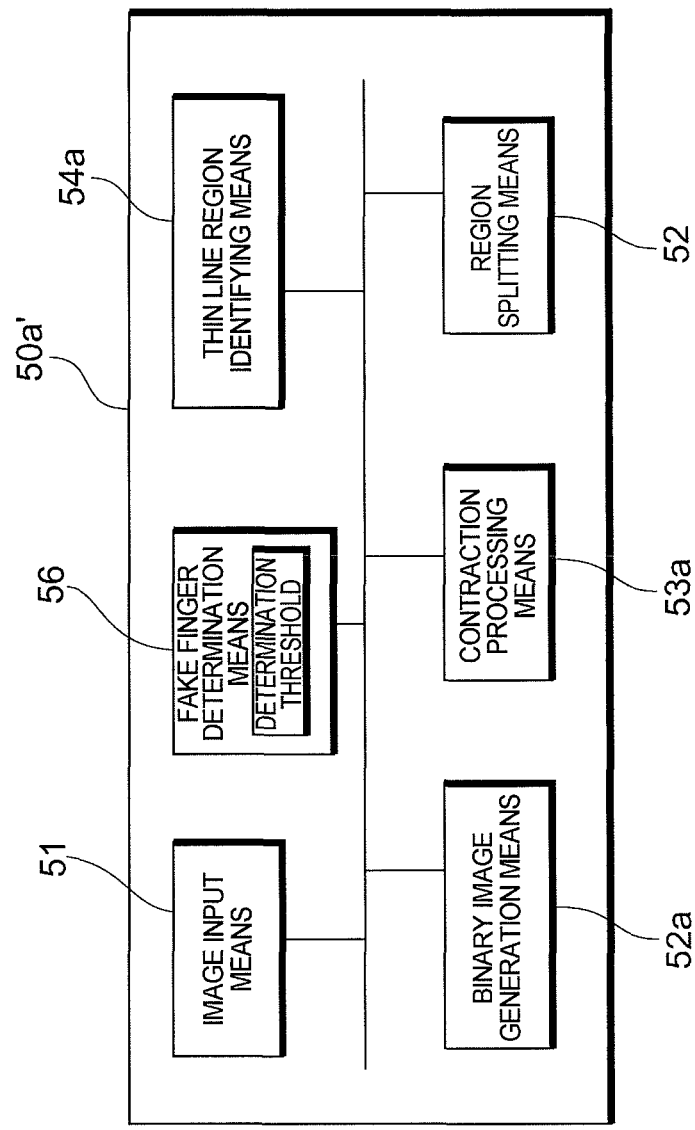
FIG. 7 is a diagram showing the functional block of the computer according to a modified example of the foregoing embodiment.

FIG. 7 is a functional block diagram of a computer 50a' in a modified example of the second embodiment. Note that the components that correspond to those in FIG. 5 are given the same reference numeral, and the detailed explanation thereof is omitted.

The computer 50a' comprises a region splitting means 52 and a thin line region identifying means 54a in addition to the image input means 51, the binary image generation means 52a, the contraction processing means 53a, and the fake finger determination means 56.

The region splitting means 52 splits the fingerprint image supplied from the image input means 51 into a plurality of small regions. The binary image generation means 52a binarizes the fingerprint image of the respective small regions that were split and generates a binary image for each small region. The contraction processing means 53a performs the same contraction processing as the second embodiment to each small region.

The thin line region identifying means 54a identifies a small region in which the total number of white pixels after the contraction processing is a predetermined threshold or less (that is, a region containing a ridge with a small line width; hereinafter referred to as the "thin ridge region") among the plurality of small regions that were subject to contraction processing, counts the number of identified thin ridge regions, and notifies the count result to the fake finger determination means 56. The fake finger determination means 56 compares the count result notified from the thin line region identifying means 54a and the determination threshold that was set, and determines whether or not the determination object T is a fake finger based on the comparison results. Specifically, the fake finger determination means 56 determines that the determination object T is a fake finger when the count result is the determination threshold or more (that is, when the number of thin ridge regions is the determination threshold or more) since this means that numerous ridges with a small line width exist in the fingerprint image. Here, the determination threshold and the like may be obtained in advance via testing and the like.

Note that, in the foregoing example, whether or not the finger is a fake finger was determined by using the count result of the number of small regions (that is, thin ridge regions) in which the number of white pixels is smaller than a predetermined threshold, but it is also possible to determine whether the finger is a fake finger by obtaining the ratio of thin ridge regions relative to all small regions, and using the obtained ratio of thin ridge regions. Specifically, the thin line region identifying means 54a obtains the ratio of thin ridge regions relative to all small regions in substitute for counting the number of thin ridge regions, and outputs the obtained ratio of thin ridge regions to the fake finger determination means 56. The fake finger determination means 56 determines that the determination object T is a fake finger when the obtained ratio of thin ridge regions is the determination ratio threshold or more since this means that numerous ridges with a small line width exist in the fingerprint image. Here, the determination ratio threshold and the like may be obtained in advance via testing and the like.

D. Third Embodiment (1) Configuration of this Embodiment

Figure 8:
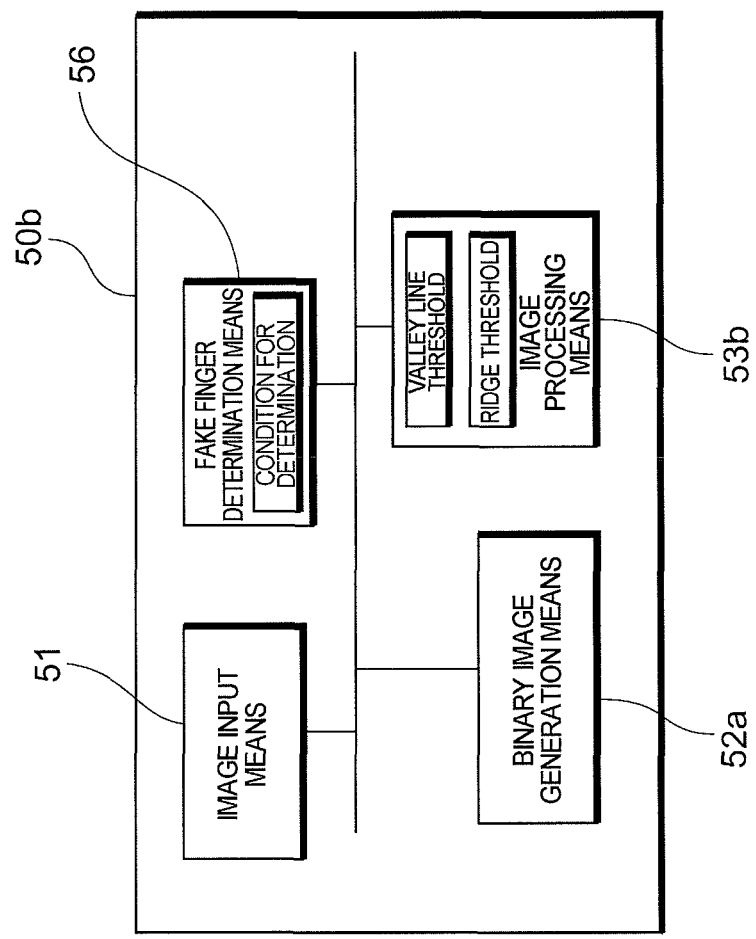
FIG. 8 is a diagram showing the functional block of the computer according to the third embodiment.

FIG. 8 is a functional block diagram of a computer 50b in the third embodiment. Note that the components that correspond to those in FIG. 5 are given the same reference numeral, and the detailed explanation thereof is omitted.

The computer 50b comprises an image input means 51, a binary image generation means 52a, an image processing means 53b, and a fake finger determination means 56.

The image processing means (contraction processing means, expansion processing means) 53b performs the following contraction processing and the expansion processing on the binary image supplied from the binary image generation means 52a.

<Contraction Processing>

The image processing means 53b repeatedly performs the contraction processing explained in the foregoing second embodiment (that is, processing of reducing the region (region mainly containing the ridge) of the white pixels by substituting the white pixels with the black pixels when the number of white pixels in the neighborhood of 4 or neighborhood of 8 is a predetermined number or less). Specifically, the image processing means 53b repeats the contraction processing until the total number of white pixels of the fingerprint image after the contraction processing becomes the ridge threshold or less. Note that the ridge threshold that is set represents, for example, the lower limit of the white pixels in which it can be deemed that the ridge has been eliminated, and can be obtained in advance via testing and the like. When the image processing means 53b detects that the total number of white pixels of the fingerprint image is the ridge threshold or less, it notifies the number of times that the contraction processing has been performed up to that time to the fake finger determination means 56. In other words, the image processing means 53b notifies the total contraction processing count required until the ridge is eliminated (hereinafter referred to as the "ridge elimination processing count") to the fake finger determination means 56.

<Expansion Processing>

The image processing means 53b repeatedly performs the expansion processing, which is the opposite of the contraction processing explained in the foregoing second embodiment (that is, processing of reducing the region (region mainly containing the valley line) of the black pixels by substituting the black pixels with the white pixels when the number of black pixels in the neighborhood of 4 or neighborhood of 8 is a predetermined number or more). Specifically, the image processing means 53b repeatedly performs the expansion processing until the total number of black pixels of the fingerprint image after the expansion processing becomes the valley line threshold or less. Note that the valley line threshold that is set represents, for example, the lower limit of the black pixels in which it can be deemed that the valley line has been eliminated, and can be obtained in advance via testing and the like. When the image processing means 53b detects that the total number of black pixels of the fingerprint image is the valley line threshold or less, it notifies the number of times that the expansion processing has been performed up to that time to the fake finger determination means 56. In other words, the image processing means 53b notifies the total expansion processing count required until the valley line is eliminated (hereinafter referred to as the "valley line elimination processing count") to the fake finger determination means 56.

The fake finger determination means 56 determines whether or not the finger is a fake finger based on whether the ridge elimination processing count and the valley line elimination processing count notified from the image processing means 53b satisfy a predetermined relation. In other words, the fake finger determination means 56 determines that the finger corresponding to the fingerprint image is a real finger when the relation of the ridge elimination processing count (line width information) and the valley line elimination processing count (line width information) obtained for each small region is a predetermined relation (that is, a relation where the line width of the ridge is larger than the line width of the valley line in the fingerprint image). As the predetermined relation (hereinafter referred to as the "condition for determination" (condition)), for example, when the ridge elimination processing count is used as the ridge width and the valley line elimination processing count is used as the valley line width, a relation such as the value obtained by dividing the ridge width by the valley line width being a predetermined threshold (for example, "1") or more, or the value obtained by subtracting the valley line width from the ridge width being a predetermined threshold (for example, "0") or more may be used (refer to the first embodiment). Needless to say, the condition for determination is not limited to the above, and various conditions that represent a relation showing that the line width of the ridge is greater than the line width of the valley line may be used.

The fake finger determination means 56 determines that the determination object T is a live finger when the ridge elimination processing count and the valley line elimination processing count satisfy the predetermined relation since this means that the ridge width is wider than the valley line width. Meanwhile, the fake finger determination means 56 determines that the determination object T is a fake finger when the ridge elimination processing count and the valley line elimination processing count do not satisfy the predetermined relation since this means that the valley line width is wider than the ridge width.

(2) Operation of this Embodiment

Figure 9:
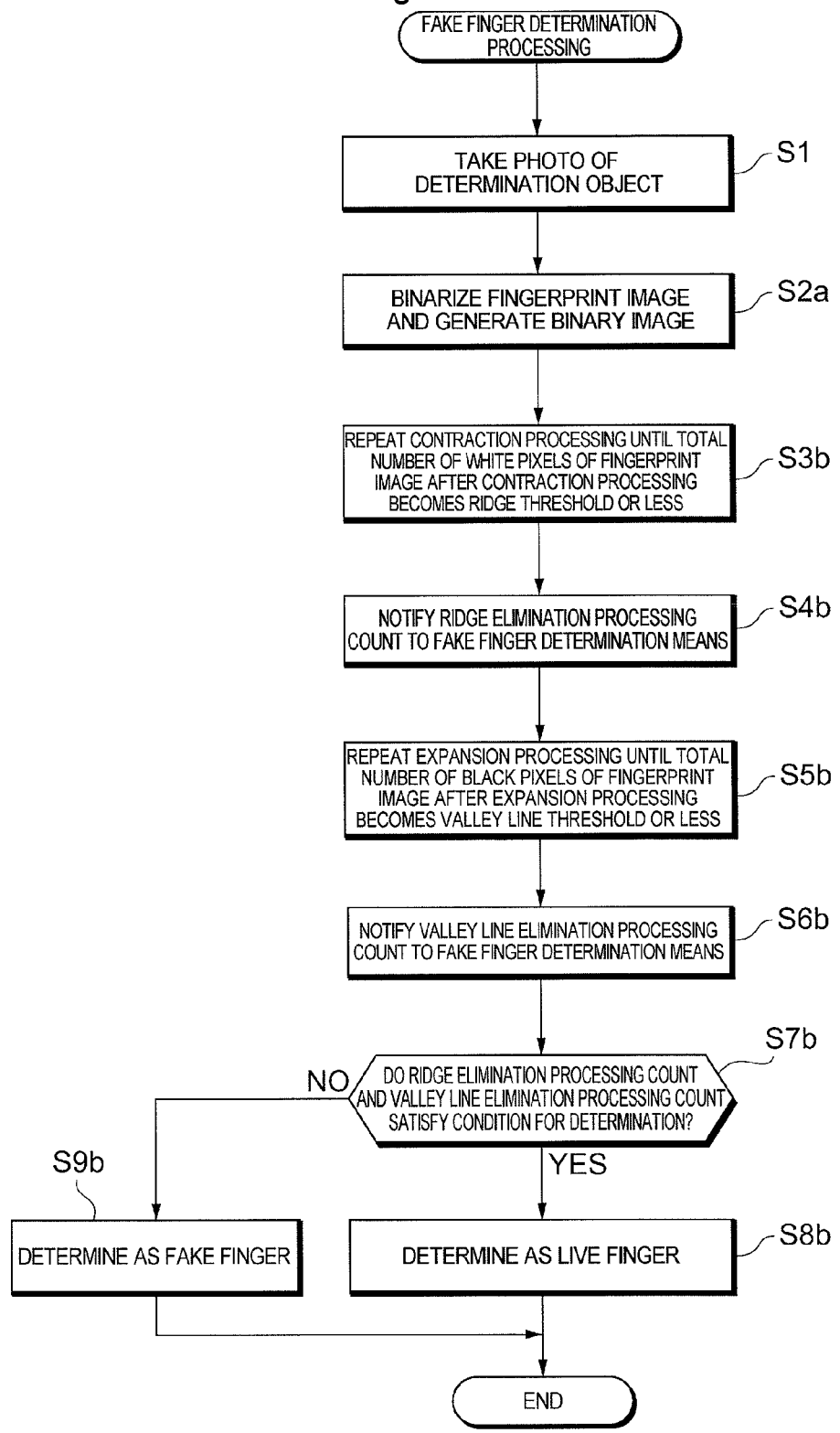
FIG. 9 is a flowchart showing the fake finger determination processing according to the foregoing embodiment.

FIG. 9 is a flowchart showing the operation of the fake finger determination device 100 in the third embodiment. Note that the steps that correspond to those in FIG. 6 are given the same reference numeral, and the detailed explanation thereof is omitted.

When the binary image generation means 52a receives a fingerprint image from the image input means 51, it binarizes the fingerprint image and thereby generates a black-and-white binary image (step S2a), and outputs the generated binary image to the image processing means 53b.

The image processing means (contraction processing means, expansion processing means) 53b performs the following contraction processing and expansion processing on the binary image supplied from the binary image generation means 52a.

The image processing means 53b repeats the contraction processing until the total number of white pixels of the fingerprint image after the contraction processing becomes the ridge threshold or less (step S3b). Note that the ridge threshold that is set represents, for example, the lower limit of the white pixels in which it can be deemed that the ridge has been eliminated, and can be obtained in advance via testing and the like.

When the image processing means 53b detects that the total number of white pixels of the fingerprint image is the ridge threshold or less, it notifies the number of times that the contraction processing has been performed up to that time; that is, the total contraction processing count (ridge elimination processing count) required until the ridge is eliminated, to the fake finger determination means 56 (step S4b).

Subsequently, the image processing means 53b repeatedly performs the expansion processing until the total number of black pixels of the fingerprint image after the expansion processing becomes the valley line threshold or less (step S5b). Note that the valley line threshold that is set represents, for example, the lower limit of the black pixels in which it can be deemed that the valley line has been eliminated, and can be obtained in advance via testing and the like.

When the image processing means 53b detects that the total number of black pixels of the fingerprint image is the valley line threshold or less, it notifies the number of times that the expansion processing has been performed up to that time; that is, the total expansion processing count (hereinafter referred to as the "valley line elimination processing count") required until the valley line is eliminated, to the fake finger determination means 56 (step S6b).

The fake finger determination means 56 determines whether or not the finger is a fake finger based on whether the ridge elimination processing count and the valley line elimination processing count notified from the image processing means 53b satisfy a predetermined relation (specifically, the foregoing "condition for determination") (step S7b). The fake finger determination means 56 determines that the determination object T is a live finger when the relation of the ridge elimination processing count and the valley line elimination processing count satisfy the condition for determination since this means that the ridge width is wider than the valley line width (step S8b), and then ends the processing. Meanwhile, the fake finger determination means 56 determines that the determination object T is a fake finger when the relation of the ridge elimination processing count and the valley line elimination processing count do not satisfy the condition for determination since this means that the valley line width is wider than the ridge width (step S9b), and then ends the processing.

As explained above, according to the third embodiment, even if the determination object is the finger of a woman or a child (that is, a finger in which both the ridge and valley line are thin), it is possible to accurately determine whether or not the finger is a fake finger. Specifically, in the foregoing second embodiment, only the line width of the ridge was used to determine whether or not the finer is a fake finger (specifically, determining whether the line width of the ridge is thick or thin based on the number of white pixels after the contraction processing, and determining the finger as a fake finger when the line width of the ridge is thin). However, with the foregoing configuration, although it is possible to accurately determine a fake finger with respect to a fake finger (reverse transfer fingerprint) having a thin ridge and a thick valley line, there is a possibility that a live finger in which both the ridge and valley line are thin (that is, a finger of a woman or a child) may also be erroneously determined as a fake finger.

Meanwhile, according to the third embodiment, since whether or not the finger is a fake finger is determined by using the relation of the line width of the ridge and the line width of the valley line, even when the determination object is a finger in which both the ridge and valley line are thin such as a finger of a woman or child, so as long as that finger possesses the characteristics of a live finger (that is, the line width of the ridge is thicker than the line width of the valley line), it is possible to inhibit the possibility of erroneously determining an authentic finger in which both the ridge and valley line are thin (that is, a finger of a woman or child) is a fake finger.

(3) Modified Example

Note that in the third embodiment, as with the second embodiment, the fingerprint image may be split into small regions and the contraction processing may be performed for each small region.

Figure 10:
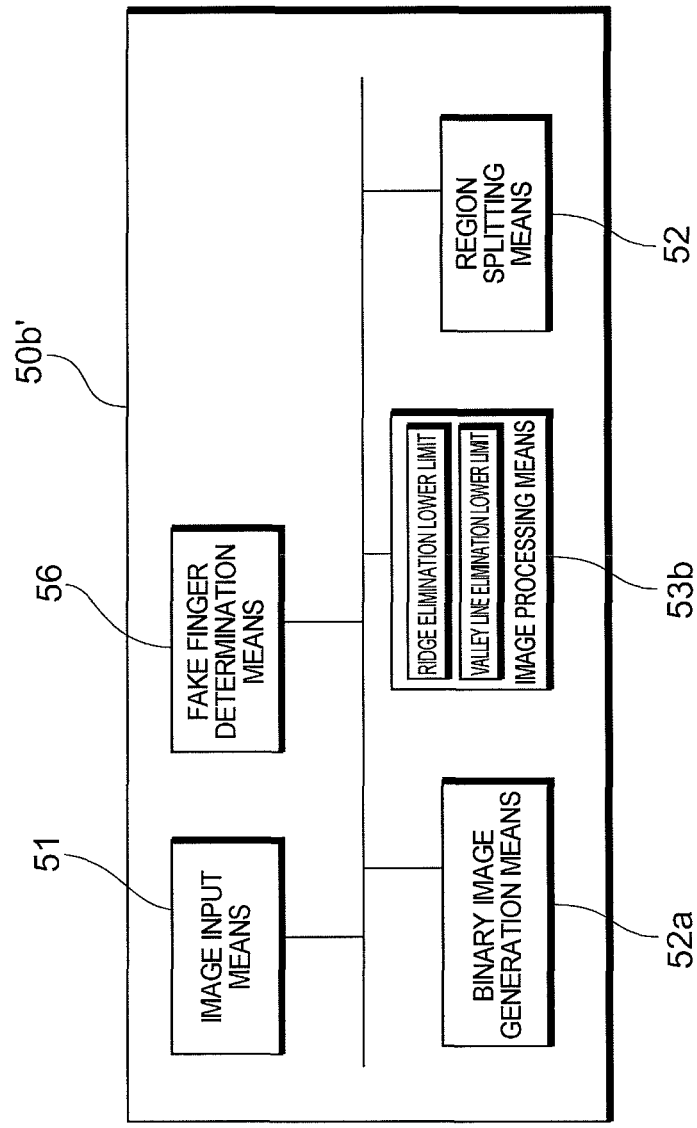
FIG. 10 is a diagram showing the functional block of the computer according to a modified example of the foregoing embodiment.

FIG. 10 is a functional block diagram of a computer 50b' in a modified example of the third embodiment. Note that the components that correspond to those in FIG. 8 are given the same reference numeral, and the detailed explanation thereof is omitted.

The computer 50b' comprises a region splitting means 52 in addition to the image input means 51, the binary image generation means 52a, the image processing means 53b, and the fake finger determination means 56.

The region splitting means 52 splits the fingerprint image supplied from the image input means 51 into a plurality of small regions. The binary image generation means 52a binarizes the fingerprint image of the respective small regions that were split and generates a binary image for each small region. The image processing means 53b performs the same contraction processing and expansion processing as the third embodiment to each of the small regions.

<Contraction Processing>

The image processing means 53b repeats the contraction processing until the total number of white pixels in the small region of each small region becomes the ridge threshold or less in each region. Note that the ridge threshold in each region that is set represents, for example, the lower limit of the white pixels in which it can be deemed that the ridge has been eliminated in the small region, and can be obtained in advance via testing and the like. When the image processing means 53b completes the foregoing contraction processing for all regions, it counts the number of small regions in which the contraction processing count is the contraction processing lower limit or less (hereinafter referred to as the "deemed number of thin ridge regions"). For example, if the contraction processing lower limit is set to "5", the image processing means 53b counts the deemed number of thin ridge regions among the small regions that were subject to the foregoing contraction processing in which the contraction processing count is "5" or less. In addition, the image processing means 53b notifies the deemed number of thin ridge regions to the fake finger determination means 56.

<Expansion Processing>

The image processing means 53b repeats the expansion processing until the total number of black pixels in the small region of each small region becomes the valley line threshold or less in each region. Note that the valley line threshold in each region that is set represents, for example, the lower limit of the black pixels in which it can be deemed that the valley line has been eliminated in the small region, and can be obtained in advance via testing and the like. When the image processing means 53b completes the foregoing expansion processing for all regions, it counts the number of small regions in which the expansion processing count is the expansion processing lower limit or less (hereinafter referred to as the "deemed number of thin valley line regions"). For example, if the expansion processing lower limit is set to "5", the image processing means 53b counts the deemed number of thin valley line regions among the small regions that were subject to the foregoing expansion processing in which the expansion processing count is "5" or less. In addition, the image processing means 53b notifies the deemed number of thin valley line regions to the fake finger determination means 56.

The fake finger determination means 56 determines whether the finger is a fake finger by determined whether the deemed number of thin ridge regions and the deemed number of thin valley line regions notified from the image processing means 53b satisfy a predetermined relation. As the predetermined relation (hereinafter referred to as the "condition for determination"), for example, a relation such as the value obtained by dividing the deemed number of thin ridge regions by the deemed number of thin valley line regions being a predetermined threshold (for example, "1") or more, or the value obtained by subtracting the deemed number of thin valley line regions from the deemed number of thin ridge regions being a predetermined threshold (for example, "0") or more may be used (refer to first embodiment). Needless to say, the condition for determination is not limited to the above, and various conditions that represent a relation showing that the deemed number of thin ridge regions is greater than the deemed number of thin valley line regions may be used.

The fake finger determination means 56 determines that the determination object T is a fake finger when the deemed number of thin ridge regions and the deemed number of thin valley line regions satisfy the predetermined relation since this means that the ratio of the thin ridge is greater than the thin valley line in the fingerprint image. Meanwhile, the fake finger determination means 56 determines that the determination object T is an authentic finger when the deemed number of thin ridge regions and the deemed number of thin valley line regions do not satisfy the predetermined relation since this means that the ratio of the thin valley line is greater than the thin ridge in the fingerprint image.

Moreover, the order of the steps of the respective processes shown in this embodiment can be arbitrarily changed or executed in parallel to the extent that there is no inconsistency in the processing contents. In addition, the terms "means" as used in the present specification and the like does not simply refer to a physical means, and also includes cases where the function of such means is realized by software. Furthermore, the functions of one means may be realized by two or more physical means, and the functions of two or more means may be realized by one physical means. Moreover, the software according to the present invention can be installed or loaded in a computer through various recording mediums such as a CD-ROM or DVD-ROM or other optical disks, a magnetic disk, or a semiconductor memory, or by being downloaded via a communication network or the like.

This application relates to and claims priority from Japanese Patent Application No. 2009-290187, filed on Dec. 22, 2009, the entire disclosure of which is incorporated herein by reference.

The present invention was explained above with reference to the embodiments, but the present invention is not limited to the foregoing embodiments. The configuration and details of the present invention can be variously modified by those skilled in the art within the scope of the present invention.

The fake finger determination device according to the present invention is suitable for improving the determination accuracy of a fake finger.

100 . . . fake finger determination device, 10 . . . housing, 20 . . . sensor surface, 30 . . . light source, 40 . . . imaging device, 50, 50a, 50a', 50b, 50b' . . . computer, 51 . . . image input means, 52 . . . region splitting means, 52a . . . binary image generation means, 53 . . . direction deciding means, 53a . . . contraction processing means, 53b . . . image processing means, 54 . . . line width calculation means, 54a . . . thin line region identifying means, 55 . . . line width relation determination means, 56 . . . fake finger determination means.

What is claimed is:

1. A fake finger determination device, comprising:
acquisition unit for acquiring line width information related to a line width of a ridge or a line width of a valley line of a fingerprint based on a fingerprint image; and
determination unit for determining whether or not the finger corresponding to the fingerprint image is a real finger or a fake finger based on a relation of the line width of the ridge and the line width of the valley line,
wherein the acquisition unit further comprises:
splitting unit for splitting the fingerprint image into small regions;
deciding unit for deciding, for each of the split small regions, a line direction of the ridge or the valley line in the region;
gradient derivation unit for obtaining a maximum value and a minimum value of a gradient of changes in a pixel value by scanning each of the small regions in a direction that is perpendicular to the decided line direction in the region; and
line width calculation unit for obtaining the line width information by setting, as a line width starting point, a point where the gradient of changes in the pixel value obtained by scanning each of the small regions in the direction perpendicular to the line direction takes the maximum value, setting a point where the gradient of changes takes the minimum value as a line width end point, and counting the number of pixels from the line width starting point to the line width end point.

2. The fake finger determination device according to claim 1,
wherein the acquisition unit obtains both pieces of information of the line width information related to the line width of the ridge and the line width information related to the line width of the valley line, and
the determination unit determines that the finger corresponding to the fingerprint image is a real finger upon determining that the line width of the ridge is greater than the line width of the valley line in the fingerprint image based on the both pieces of information.

3. A fake finger determination device, comprising:
acquisition unit for acquiring line width information related to a line width of a ridge or a line width of a valley line of a fingerprint based on a fingerprint image; and
determination unit for determining whether or not the finger corresponding to the fingerprint image is a real finger or a fake finger based on a relation of the line width of the ridge and the line width of the valley line,
wherein the acquisition unit further comprises:
binary image generation unit for binarizing the fingerprint image and outputting a binary image;
image processing unit for performing contraction processing or expansion processing on the binary image a preset number of times; and
counting unit for obtaining the line width information by counting the number of white pixels in the binary image remaining after the contraction processing has been performed the preset number of times or by counting the number of black pixels in the binary image remaining after the expansion processing has been performed the preset number of times.

4. The fake finger determination device according to claim 3,
wherein the acquisition unit obtains both pieces of information of the line width information related to the line width of the ridge and the line width information related to the line width of the valley line, and
the determination unit determines that the finger corresponding to the fingerprint image is a real finger upon determining that the line width of the ridge is greater than the line width of the valley line in the fingerprint image based on the both pieces of information.

5. A fake finger determination device, comprising:
acquisition unit for acquiring line width information related to a line width of a ridge or a line width of a valley line of a fingerprint based on a fingerprint image; and
determination unit for determining whether or not the finger corresponding to the fingerprint image is a real finger or a fake finger based on a relation of the line width of the ridge and the line width of the valley line,
wherein the acquisition unit further includes:
binary image generation unit for binarizing the fingerprint image and outputting a binary image;
image processing unit for repeatedly performing contraction processing on the binary image until the total number of white pixels after the contraction processing becomes a ridge threshold or less, or for repeatedly performing expansion processing on the binary image until the total number of black pixels after the expansion processing becomes a valley line threshold or less; and counting unit for obtaining the line width information by counting the number of times the contraction processing has been performed or the number of time the expansion processing has been performed.

6. The fake finger determination device according to claim 5, wherein the acquisition unit obtains both pieces of information of the line width information related to the line width of the ridge and the line width information related to the line width of the valley line, and the determination unit determines that the finger corresponding to the fingerprint image is a real finger upon determining that the line width of the ridge is greater than the line width of the valley line in the fingerprint image based on the both pieces of information.

7. A fake finger determination device, comprising:
acquisition unit for acquiring line width information related to a line width of a ridge or a line width of a valley line of a fingerprint based on a fingerprint image; and
determination unit for determining whether or not the finger corresponding to the fingerprint image is a real finger or a fake finger based on a relation of the line width of the ridge and the line width of the valley line,
wherein the acquisition unit further comprises:
splitting unit for splitting the fingerprint image into small regions;
deciding unit for deciding, for each of the split small regions, a line direction of the ridge or the valley line in the region; and
line width calculation unit for obtaining the line width information by binarizing the fingerprint image for each of the small regions, scanning each of the small regions in a direction that is perpendicular to the decided line direction in the region and counting the consecutive number of black pixels or the consecutive number of white pixels.

8. The fake finger determination device according to claims 7, wherein the acquisition unit obtains both pieces of information of the line width information related to the line width of the ridge and the line width information related to the line width of the valley line, and the determination unit determines that the finger corresponding to the fingerprint image is a real finger upon determining that the line width of the ridge is greater than the line width of the valley line in the fingerprint image based on the both pieces of information.

9. A fake finger determination method, comprising the steps of:
acquiring line width information related to a line width of a ridge or a line width of a valley line of a fingerprint based on a fingerprint image; and
determining whether or not the finger corresponding to the fingerprint image is a real finger or a fake finger based on a relation of the line width of the ridge and the line width of the valley line,
wherein the acquisition step further comprises the steps of:
splitting the fingerprint image into small regions;
deciding, for each of the split small regions, a line direction of the ridge or the valley line in the region;
obtaining a maximum value and a minimum value of a gradient of changes in a pixel value by scanning each of the small regions in a direction that is perpendicular to the decided line direction in the region; and
obtaining the line width information by setting, as a line width starting point, a point where the gradient of changes in the pixel value obtained by scanning each of the small regions in the direction perpendicular to the line direction takes the maximum value, setting a point where the gradient of changes takes the minimum value as a line width end point, and counting the number of pixels from the line width starting point to the line width end point.

10. A fake finger determination method, comprising the steps of:
acquiring line width information related to a line width of a ridge or a line width of a valley line of a fingerprint based on a fingerprint image; and
determining whether or not the finger corresponding to the fingerprint image is a real finger or a fake finger based on a relation of the line width of the ridge and the line width of the valley line,
wherein the acquisition step further comprises the steps of:
binarizing the fingerprint image and outputting a binary image;
performing contraction processing or expansion processing on the binary image a preset number of times; and
obtaining the line width information by counting the number of white pixels in the binary image remaining after the contraction processing has been performed the preset number of times or by counting the number of black pixels in the binary image remaining after the expansion processing has been performed the preset number of times.

11. A fake finger determination method, comprising the steps of:
acquiring line width information related to a line width of a ridge or a line width of a valley line of a fingerprint based on a fingerprint image; and
determining whether or not the finger corresponding to the fingerprint image is a real finger or a fake finger based on a relation of the line width of the ridge and the line width of the valley line,
wherein the acquisition step further includes the steps of:
binarizing the fingerprint image and outputting a binary image;
repeatedly performing contraction processing on the binary image until the total number of white pixels after the contraction processing becomes a ridge threshold or less, or repeatedly performing expansion processing on the binary image until the total number of black pixels after the expansion processing becomes a valley line threshold or less; and
obtaining the line width information by counting the number of times the contraction processing has been performed or the number of time the expansion processing has been performed.

12. A fake finger determination method, comprising the steps of:
acquiring line width information related to a line width of a ridge or a line width of a valley line of a fingerprint based on a fingerprint image; and
determining whether or not the finger corresponding to the fingerprint image is a real finger or a fake finger based on a relation of the line width of the ridge and the line width of the valley line,
wherein the acquisition step further comprises the steps of:
splitting the fingerprint image into small regions;
deciding, for each of the split small regions, a line direction of the ridge or the valley line in the region; and
obtaining the line width information by binarizing the fingerprint image for each of the small regions, scanning each of the small regions in a direction that is perpendicular to the decided line direction in the region and counting the consecutive number of black pixels or the consecutive number of white pixels.

* * * * *